(12) United States Patent
Antoniazzi et al.

(10) Patent No.: US 8,830,642 B2
(45) Date of Patent: Sep. 9, 2014

(54) SYSTEM AND METHOD FOR PROTECTING AN ELECTRICAL GRID AGAINST FAULTS

(75) Inventors: Antonello Antoniazzi, Milan (IT); Luca Raciti, Bergamo (IT)

(73) Assignee: ABB S.p.A., Milan (IT)

( * ) Notice: Subject to any disclaimer, the term of this patent is extended or adjusted under 35 U.S.C. 154(b) by 88 days.

(21) Appl. No.: 13/560,203

(22) Filed: Jul. 27, 2012

(65) Prior Publication Data

US 2013/0027829 A1    Jan. 31, 2013

(30) Foreign Application Priority Data

Jul. 28, 2011  (EP) .................................... 11175713

(51) Int. Cl.
*H02H 7/28*   (2006.01)
*H02H 7/26*   (2006.01)

(52) U.S. Cl.
CPC ....... *H02H 7/262* (2013.01); *H02H 7/28* (2013.01)
USPC .......................................................... 361/62

(58) Field of Classification Search
USPC .......................................................... 361/62
See application file for complete search history.

(56) References Cited

U.S. PATENT DOCUMENTS

| | | | |
|---|---|---|---|
| 3,970,898 A | 7/1976 | Baumann et al. | |
| 6,297,939 B1 | 10/2001 | Bilac et al. | |
| 7,110,231 B1 | 9/2006 | De La Ree et al. | |
| 2007/0121257 A1* | 5/2007 | Maitra et al. ...................... | 361/2 |

OTHER PUBLICATIONS

European Search Report (EPO-Form 1507N) dated Dec. 19, 2011.

* cited by examiner

*Primary Examiner* — Ronald W Leja
(74) *Attorney, Agent, or Firm* — Buchanan Ingersoll & Rooney PC

(57) ABSTRACT

A system and method are provided for protecting a power grid against electric faults. A first circuit breaker is associated with a first electronic unit and positioned at a first hierarchy level. One or more additional circuit breakers, each including a corresponding second electronic unit, are positioned at one or more additional levels hierarchically lower than the first level and cascaded to each other. The first circuit breaker includes at least one semiconductor electronic breaking device. The first electronic unit is configured to, upon the appearance of an electric fault in a grid area, drive the breaking device to limit the current flowing through it for a predetermined period of time, and send to the circuit breakers on lower hierarchy levels an intervention command to allow intervention, among the circuit breakers that detected the fault, of the closest circuit breaker positioned immediately upstream from the area where the fault occurred.

16 Claims, 4 Drawing Sheets

SYSTEM AND METHOD FOR PROTECTING AN ELECTRICAL GRID AGAINST FAULTS

RELATED APPLICATION

This application claims priority under 35 U.S.C. §119 to European Patent Application No. 11175713.4 filed in Europe on Jul. 28, 2011, the entire content of which is hereby incorporated by reference in its entirety.

FIELD

The present disclosure relates to a system and method for protecting a power grid against electric faults.

BACKGROUND INFORMATION

It is known for electric power supply grids or systems to use protection devices, such as circuit breakers, which serve several functions that are needed in order to ensure the correct operation of the electrical circuit into which they are inserted and the loads connected thereto. For instance, they ensure the availability of the nominal current necessary for several utilities, enable the proper insertion and disconnection of loads from the circuit, and in particular they protect the grid and the loads installed therein against fault events such as overloads and short circuits.

Numerous industrial solutions for the aforementioned devices exist for this purpose. The most typical and traditional solution uses one or more pairs of contacts, which are coupled or separated by mechanical or electromechanical means so as to break or restore the flowing current.

Other more advanced protection devices include automatic circuit breakers provided with an electronic protection unit to activate, in case of a fault, a kinematic chain causing the separation of the circuit breaker contacts.

It is known that during a fault event in the power grid it is particularly important to obtain a very high intervention selectivity of the above mentioned protection devices.

The term "intervention selectivity" or in short, "selectivity", is understood to mean the capability of isolating from the power supply relatively limited portions of the grid which are close to the fault location.

In other words, the term "selectivity" indicates the capability to operate in a coordinated and limited way, in order to reduce the inefficiency caused by the fault, limiting the inefficiency only to the portions of the grid effectively at risk and thus preserving, at the same time, the operative status of the rest of the system or grid.

On the other hand, it is known that obtaining a high level of selectivity is a particularly difficult aspect in the system design. In fact, it is necessary to reconcile the requirements of better intervention reliability with the obvious need to contain the costs of building and managing the electric grid.

In traditional power grids, a certain selectivity level is obtained by distributing the protection devices throughout hierarchical levels differentiated from a power based point of view (upstream levels, that is closer to the power source are traditionally considered as belonging to a higher hierarchy), and selecting the tripping characteristics for each protection device according to the hierarchy level occupied by the device.

Given that every branch of the grid is dimensioned to safely conduct sufficient electrical power to supply all of the lower levels connected to it, selectivity is obtained by exploiting the differentiation in the tripping parameters (trip current, tripping time, contact mechanical inertia, etc.) existing among the protection devices belonging to different hierarchy levels.

In this way, the inefficiency caused by a fault event only affects the portion of the grid governed by the protection device having the hierarchy level immediately above the level or position where the fault itself occurred.

Some of the technical solutions of the known type provide for the use of protection devices of the so called EFDP (Early Fault Detection Prevention) type, with the capability to communicate between one another, in order to coordinate the respective intervention modalities in case of a fault event.

These established solutions are designed according to selectivity and intervention logic of the bottom-up type, for example, when an EFDP device detects a fault, regardless of its position on the grid, it generates an interlock signal which is sent to all the other EFDP devices located upstream on the grid, inhibiting their intervention capability.

If the EFDP device in question is not itself interlocked by another EFDP device located downstream, it directly operates breaking the current.

Even though the solutions of the known type allow performing the functionality for which they were designed reasonably well, there is nonetheless room and need for further improvement.

SUMMARY

An exemplary embodiment of the present disclosure provides a system for the protection of a power grid against electric faults. The exemplary system includes a plurality of circuit breakers each associated with a corresponding grid area. The plurality of circuit breakers include at least a first circuit breaker operatively associated with a first electronic unit and positioned at a first hierarchy level, and one or more additional circuit breakers each including a corresponding second electronic unit and positioned at one or more additional levels hierarchically lower than the first level and in cascade to each other. The first circuit breaker includes at least one semiconductor electronic breaking device. The first electronic unit is configured to, upon appearance of an electric fault in a grid area: (i) drive the semiconductor electronic breaking device so as to limit the current flowing through the semiconductor electronic breaking device for a predetermined period of time; and (ii) send to at least one of the one or more additional circuit breakers an intervention command suitable to allow the intervention, among the circuit breakers that detected the fault, of the circuit breaker positioned closest and immediately upstream of the area where the fault occurred.

An exemplary embodiment of the present disclosure provides a method for the protection of a power grid provided with a plurality of circuit breakers, each of the circuit breakers being associated with a corresponding grid area to be protected against electric faults. The exemplary method includes positioning at a first hierarchy level at least a first circuit breaker operatively associated with a first electronic unit and including at least one semiconductor electronic breaking device, and positioning one or more additional circuit breakers each including a corresponding second electronic unit at one or more additional levels hierarchically lower than the first level and in cascade to each other. The exemplary method also includes, upon the appearance of an electric fault in a grid area, driving, by means of the first electronic unit, the semiconductor electronic breaking device so as to at least limit the current flowing through the semiconductor electronic breaking device for a predetermined period of time. In addition, the exemplary method includes sending to at least one of the one or more additional circuit breakers an intervention command suitable to enable the opening, among the circuit breakers that detected the fault, of the circuit breaker positioned closest and immediately upstream of the area where the fault occurred.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
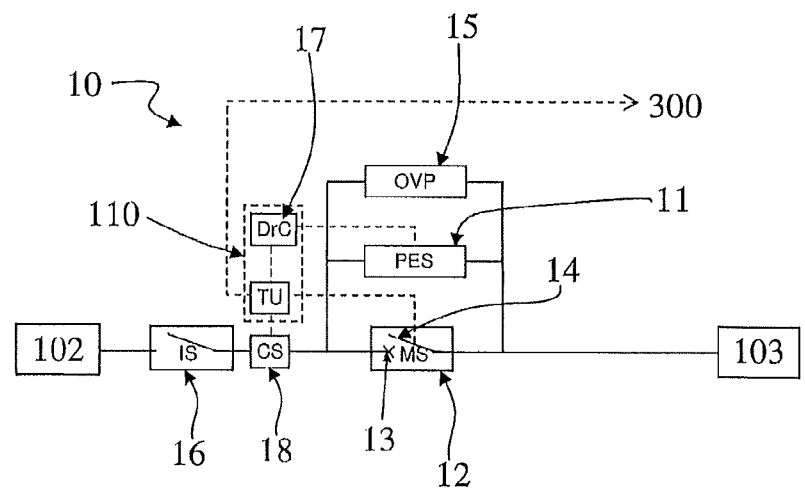
FIGS. 1 and 2 are block diagrams that schematically illustrate two exemplary embodiments of a circuit breaker used in the system and method according to the present disclosure.

Exemplary embodiments of the present disclosure provide an improved solution with respect to known solutions; in particular with respect to selective interventions upon the detection of an electric fault on the grid.

Exemplary embodiments of the present disclosure provide a system and method for protecting the electric grid from electric faults.

For instance, an exemplary embodiment of the present disclosure provides a system for the protection of a power grid against electric faults. The exemplary system includes a plurality of circuit breakers each associated with a corresponding grid area, where the plurality of circuit breakers include at least a first circuit breaker operatively associated with a first electronic unit and positioned at a first hierarchy level, and one or more additional circuit breakers each including a corresponding second electronic unit and positioned at one or more additional levels hierarchically lower than the first level and in cascade to each other. The first circuit breaker includes at least one semiconductor electronic breaking device. The first electronic unit is configured so that upon appearance of an electric fault in a grid area: the first electronic unit (i) drives the semiconductor electronic breaking device so as to at least limit the current flowing through it for a predetermined period of time; and (ii) sends to at least one of the one or more additional circuit breakers an intervention command suitable to allow the intervention, among the circuit breakers that detected the fault, of the circuit breaker positioned closest and immediately upstream of the area where the fault occurred.

An exemplary embodiment of the present disclosure also provides a method for the protection of a power grid provided with a plurality of circuit breakers each associated with a corresponding grid area to be protected against electric faults. The exemplary method includes positioning at a first hierarchy level at least a first circuit breaker operatively associated with a first electronic unit and including at least one semiconductor electronic breaking device, and one or more additional circuit breakers each including a corresponding second electronic unit at one or more additional levels hierarchically lower than the first level and in cascade to each other. The exemplary method also includes, upon the appearance of an electric fault in a grid area, driving, by means of the first electronic unit, the semiconductor electronic breaking device so as to at least limit the current flowing through it for a predetermined period of time. In addition, the exemplary method includes sending to at least one of the one or more additional circuit breakers an intervention command suitable to enable the opening, among the circuit breakers that detected the fault, of the circuit breaker positioned closest and immediately upstream of the area where the fault occurred.

For the sake of simplicity, in the following description functional and/or structurally identical or similar elements will be indicated by the same reference numbers in the different embodiments illustrated hereinafter.

Figure 4:
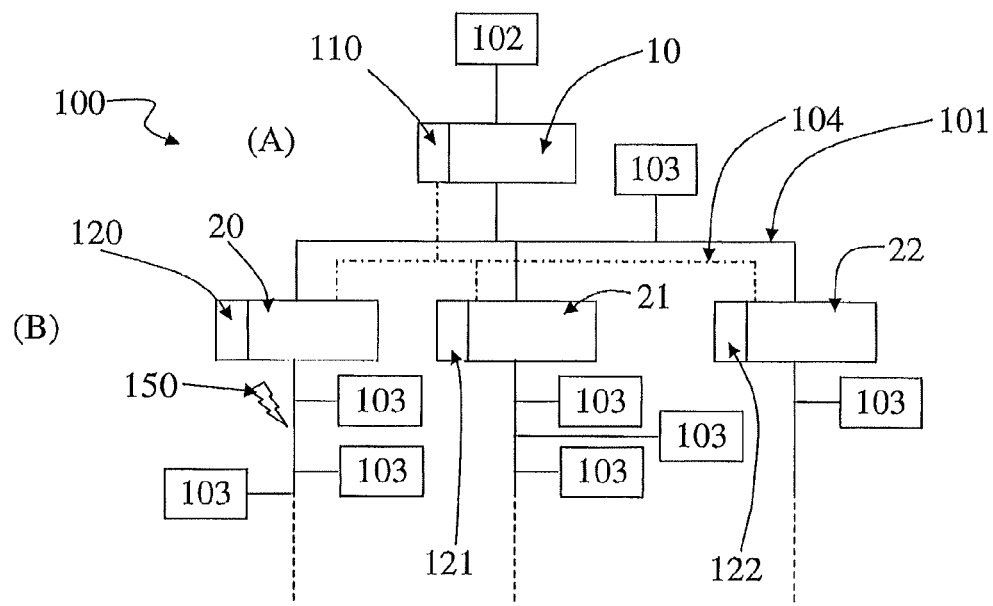
FIGS. 4 and 5 schematically illustrate two examples of a power grid, wherein a plurality of circuit breakers are positioned on two and three hierarchical levels, respectively.
Figure 5:
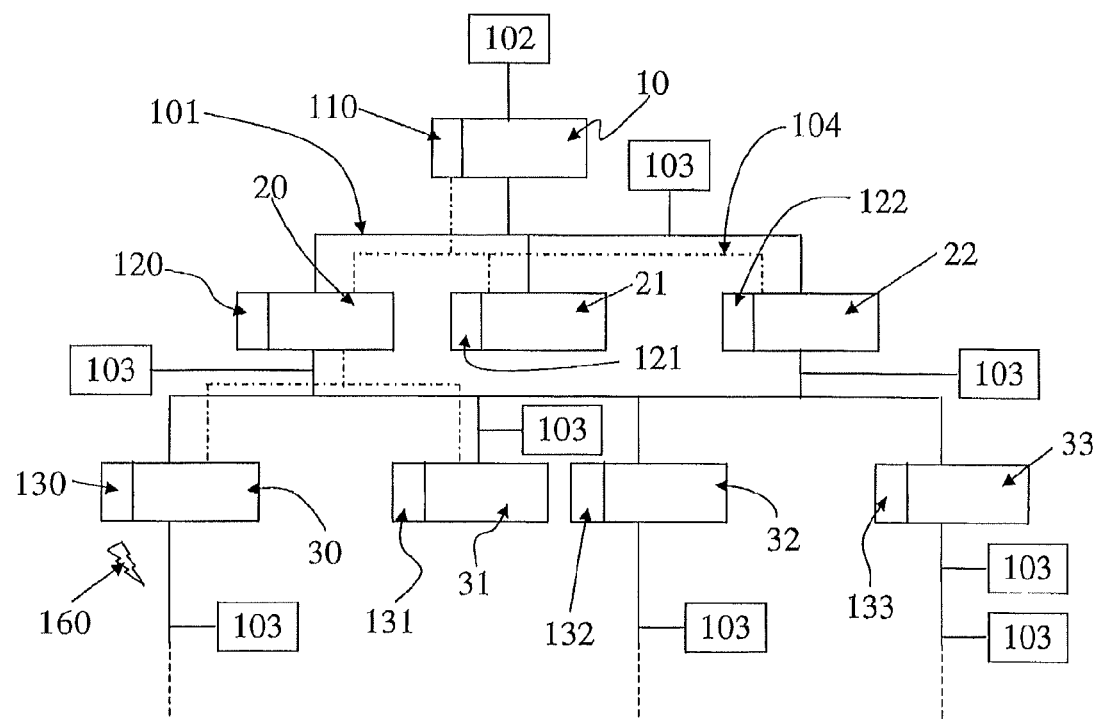

FIGS. 4 and 5 schematically illustrate a power grid 101, which is operatively connected to an electric power supply source 102 and provided with a plurality of circuit breakers 10, 20, 21, 22, 30, 31, 32, 33, etc. Such circuit breakers are arranged along the branched structure of the grid 101 on two or more levels, each one protecting a corresponding grid area of various width, with respective loads connected thereto, schematically indicated in the drawings by reference number 103.

In the illustrative example in FIG. 4, the circuit breakers are arranged only on two levels (A), (B), while in the example in FIG. 5 there is an additional third level (C); clearly, such examples are not to be understood as being limiting in any way, since the method 200 and system 100 according to the present disclosure, together with the additional features to be described hereinafter, are similarly applicable without regard to the number of circuit breakers and levels on which they are positioned. Furthermore, the term "load" is to be understood as the grid portion seen downstream (with respect to the source) of a circuit breaker, including the utilities connected to such downstream area. Such area may have any extension and configuration and may include any end utility (or other equivalent load).

Figure 6:
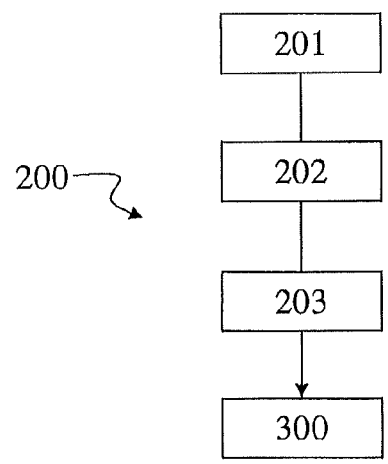
FIG. 6 is a block diagram that schematically represents the different steps of a protection method according to an exemplary embodiment of the present disclosure.

In the system 100 and method 200 according to the present disclosure, at least a first circuit breaker 10 operatively associated with a first electronic command and control unit 110, is positioned (step 201 of the method illustrated in FIG. 6) at a first hierarchy level (A) of the grid. Furthermore, (step 201) one or more additional circuit breakers 20, 21, 22, 30, 31, 32, n, etc. each including a corresponding second electronic unit 120, 121, 122, 130, 131, 132, n, etc. are positioned at one or more additional levels (B), (C) that are hierarchically lower than the first level (A) and in cascade (e.g., cascaded) to each other, that is to say the third level is hierarchically lower than the second, the fourth is lower than the third, and so on.

A bidirectional control bus, indicated in FIGS. 4 and 5 by dashed line 104, is suitable for establishing a communication between the first electronic unit 110 and one or more of the second electronic units 120, 121, 122, 130, 131, etc., each associated with one of the additional circuit breakers 20, 21, 22, 30, 31, etc. For example, the control bus 104 may be a bus based on the CAN protocol or the Ethernet protocol. It is to be understood that any bus suitable for this purpose can be used.

In accordance with an exemplary embodiment, the first circuit breaker 10 includes at least one electronic semiconductor breaking device 11. According to an exemplary embodiment illustrated in FIG. 1, the first circuit breaker 10 is a hybrid circuit breaker, for example, a circuit breaker including devices based on current breaking modalities/technologies different from one another. For example, the circuit breaker 10 in FIG. 1 includes a first electronic semiconductor breaking device 11 and a second electromechanical breaking device 12, for example of the known type, having at least a fixed contact 13 and a contact 14 movable between a closed position wherein it is coupled to the fixed contact and an open position where it is separated from the fixed contact, according to embodiments widely known in the art and therefore not further described herein.

As illustrated, the electronic semiconductor breaking device 11 is electrically connected in parallel to the ends of the fixed contact 13 and the mobile contact 14 of the device 12.

The electronic breaking device 11 is, for example, based on one or more semiconductor components, which may be chosen from the thyristor family, such as, for example, thyristors, SCR (Silicon Controlled Rectifier), IGCT (Integrated Gate-Commutated Thyristor), or from the family of transistors, such as, for example, IGBT (Insulated gate Bipolar Transistor), Power MOS (Metal Oxide Semiconductor), etc. The following description will make reference to only IGBT and/or IGCT components for the sake of simplicity.

Furthermore, in the exemplary embodiment illustrated in FIG. 1, the first circuit breaker 10 includes a block or circuit of protection and dissipation 15, including, for example, metal oxides varistors MOV, whose function is to protect the semiconductor electronic device 11 from overloads and/or voltage changes (dV/dt) greater than an established threshold; also the circuit or block 15 dissipates the fault energy passing through the circuit breaker 10, especially in case of strongly inductive direct current circuits.

A disconnecting circuit breaker 16 is present only if galvanic isolation is requested.

Figure 2:
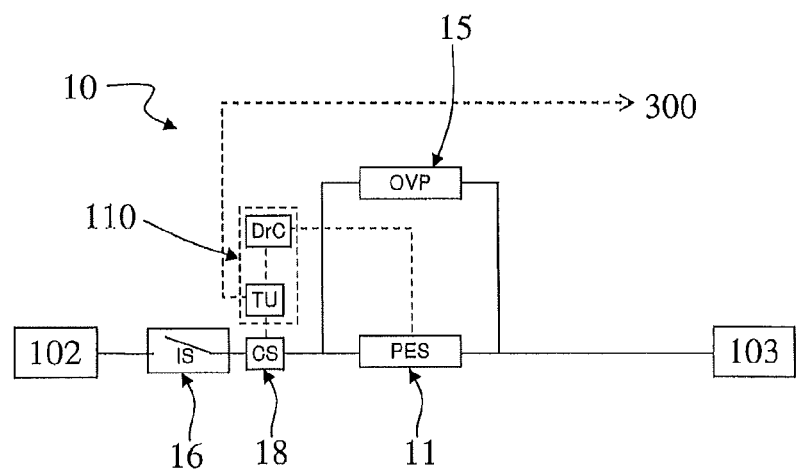

In an exemplary embodiment illustrated in FIG. 2, the first circuit breaker 10 includes a single breaking device realized by one semiconductor electronic breaking device 11 described above, for example, the first circuit breaker 10 is in practice a solid state circuit breaker, or switch, also indicated as static circuit breaker.

In substance, the exemplary embodiment in FIG. 2 follows that of circuit breaker 10 in FIG. 1, wherein however the second breaking device of traditional type 12 is missing and therefore the electronic breaking device 11 is traversed by the nominal current under normal operating conditions.

The electronic command and control unit 110 associated with the first circuit breaker 10 is a microprocessor electronic unit suitably provided with algorithms and/or circuit blocks widely known in the art or in any case readily available to those skilled in the art. In practice, the unit 110 is a "trip unit" integrated with communication and driving functions for the semiconductor breaking device 11. Commercial examples of such electronic unit 110 that may be used in the system and method according to the present disclosure are the Tmax PR222DS or Emax PR123/P units marketed by the same applicant of the present patent application.

Figure 3:
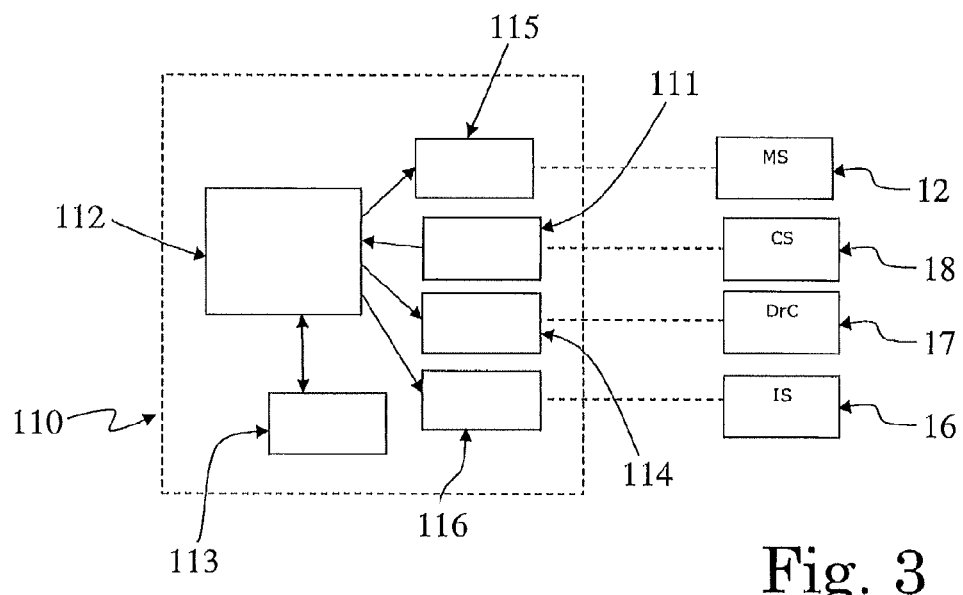
FIG. 3 is a block diagram that schematically illustrates an electronic unit that may be used in the circuit breaker of FIG. 1 or 2.

FIG. 3 is a block diagram representing an example of a command and control electronic unit 110. The unit 110 executes the protection algorithms by means of its microprocessor, and in particular those dedicated to the selectivity, based on the information obtained from: a current measuring circuit block 111; a selectivity protection processing circuit block 112 (e.g., the block where the various settings for the selectivity interventions are defined); and a circuit block 113 that interfaces with control bus 104. Furthermore, the unit 110 by means of its microprocessor and other possible related electronic circuitry: controls (by means of circuit block 114) a driving circuit or block 17 suitable to drive the semiconductor electronic breaking device 11; controls (circuit block 115) the command to the second electromechanical breaking device 12 (in case of hybrid circuit breaker 10, while such block is missing in case of a solid state circuit breaker); and controls (possible block 116) the command to the disconnecting circuit breaker 16, if present. Finally, the unit 110 manages the control bus 104 by means of its microprocessor, in accordance with the information deriving from the selectivity protection processing block 112.

The several components, for example, the microprocessor and the various blocks and/or electronic circuits, such as the driving circuit 17, may be elements integrated in a single electronic unit, or may be separate parts functionally coupled to each other and to the microprocessor.

During operation, a suitable current sensor 18 measures the flowing current and/or its derivative and transmits the measured values to the command and control electronic unit 110, which processes them by executing the various algorithms.

In case of a hybrid circuit breaker (example in FIG. 1), under normal operating conditions, the electromechanical breaking device 12 is flown through by the nominal current while the semiconductor electronic breaking device 11 is not flown through by current.

In case of a solid state or static circuit breaker (example of FIG. 2), that is to say provided with only a semiconductor electronic breaking device, if the semiconductor device 11 is based, for example, on IGCT type components, such components remain in a conducting state without any signals on the gate as long as the flowing current is greater than their threshold level (holding current); if the current goes below such value, the driving circuit 17 must drive the gate with a small current. On the contrary, if the device 11 is based on IGBT type components, the driving circuit must apply a positive voltage to the gate as close as possible to the saturation voltage so as to limit conduction losses. Under these conditions all the current flows in the circuit part including the device 11.

In both examples of FIGS. 1 and 2, the dissipation circuit 15 is discharged, and the disconnecting circuit breaker 16, if present, is closed.

If there is an electric fault in any area of the grid, for example an overload, this is always sensed by the first circuit breaker 10 (thanks to its electronic unit 110), which is placed at the higher hierarchy level (in practice upstream on the grid) and by one or more of the circuit breakers 20, 21, 30, 31, etc., (in particular thanks to the corresponding electronic units 120, 121, 130, 131, etc.) positioned at the various levels upstream of the area affected by the fault.

For instance, if the fault occurs in the area indicated by arrow 150 in the example of FIG. 4, such fault would be sensed by the circuit breaker 20 positioned at level (B) and by the circuit breaker 10 positioned at level (A); if the fault occurs in the area indicated by arrow 160 in FIG. 5, such fault would be sensed by the circuit breaker 30 positioned at level (C), by the circuit breaker 20 positioned at level (B) and by the circuit breaker 10 positioned at level (A).

When the electronic unit 110 detects the fault conditions, it commands the driving circuit 17 to suitably drive the semiconductor electronic device 11. In particular, in case of a hybrid circuit breaker, the electronic unit 110 commands the separation of the contacts 13, 14, which by opening, break the current flowing through them; under such conditions, the arcing tension necessary to make the electronic breaking device 11 conductive is generated, therefore diverting the current through it. In case that circuit breaker 10 has only the semiconductor breaking device 11 (example of FIG. 2), such condition clearly does not occur since current always flows through the breaking device and there is no electromechanical breaking device 12.

In both cases, the electronic unit 110 is configured in such a way as to drive (step 202) the semiconductor electronic breaking device 11 so as to at least limit the current flowing through it below a predefined threshold and for at least a predetermined period of time.

The driving configurations depend on the nature of the component(s) employed; for example, IGCT and other components from the thyristor family are driven by means of gate current pulses, while IGBTs are driven by applying a voltage VGE between gate and emitter.

For example, the electronic unit 110 starts limiting the current by acting on the block controlling the driving circuit 17 with a frequency (or duty cycle) calculated according to the flowing current.

In the meantime the electronic unit 110 transmits all the information necessary to execute the selectivity functions to the control bus 104; in particular, the electronic unit 110 (step 203) sends to one or more of the additional circuit breakers 20, 21, 22, 30, 31, 32, etc. arranged on lower levels an intervention command 300 suitable to allow selectively the opening, among the circuit breakers that detected the fault, of the circuit breaker placed closest and upstream to the area where the fault occurred (with respect to the grid power source).

In practice when circuit breaker 10 detects the fault, the electronic unit 110 starts to limit the current flowing through the circuit breaker 10 and the circuit breaker positioned at the level immediately below and directly affected by the fault (for example the circuit breaker 20 in FIG. 4), experiences a current reduction, thus exiting the alarm condition. However when the circuit breaker 10 sends the intervention command 300 to all the circuit breakers on the lower level (level (B)), such command is recognized only by the circuit breaker of such lower level that has effectively sensed the fault and that is assigned to the area affected by the fault itself. Such circuit breaker 20 may therefore operate by opening and breaking the power supply of the area assigned to it and located immediately downstream.

In accordance with an exemplary embodiment, and as illustrated in the example in FIG. 5, if the circuit breakers and the related electronic units are arranged on at least three levels, the one or more additional circuit breakers 20, 21, 22 positioned on the second level (B) hierarchically lower than first level (A) are each provided with a second electronic unit 120, 121, 122, etc., configured so as to propagate the opening command sent by first electronic unit 110 towards the circuit breakers positioned on a third level (level (C)) hierarchically lower than the second level. Therefore in this case, the circuit breaker 20 (always by means of the control bus 104) propagates the intervention command 300 towards the lower level; such command is recognized only by the circuit breaker of the third level (in the example of FIG. 5 the circuit breaker 30), which has effectively detected the fault 160 and it is assigned to the area affected by it. Therefore such circuit breaker 30 can intervene by opening and breaking the supply only in the immediately downstream area assigned to it.

Such selective intervention logic can be suitably expanded to any number of lower levels.

Therefore when the opening occurred (with the consequent current breaking) of a circuit breaker positioned on a lower level with respect to the first circuit breaker 10, the second electronic unit associated with the circuit breaker that performed the current breaking (for example the unit 120 associated to the circuit breaker 20 or the unit 130 of circuit breaker 30) is configured so as to transmit to the first electronic unit 110 a consent signal suitable for requesting the restoration of the operating conditions prior to the fault for the first circuit breaker 10. In practice, the open circuit breaker informs the first circuit breaker 10 that acted by sectioning and isolating the area affected by the fault, and therefore the first circuit breaker itself may return to its normal operating conditions; that is to say that there is no longer a need to limit the current through the semiconductor device 11, and possibly the electromechanical breaking device 12 may be reclosed.

Alternatively or in addition, the first electronic unit 110 is configured in such as way as to directly verify the current and therefore the extinction of the fault, namely that a downstream circuit breaker has effectively operated breaking the current. In this way the operating conditions prior to fault can be restored for the first circuit breaker 10, without waiting to receive the consent signal from a downstream circuit breaker; clearly the restoring can also occur as a result of a double check, that is a direct verification and also receiving the consent signal sent from a downstream circuit breaker.

In accordance with the system 100 and method 200 of the present disclosure, the first electronic unit 110 can be further configured so as to drive the semiconductor electronic breaking device 11 and completely break the current flowing through it for a predetermined period of time, for example a period greater than or equal to 100 μs (one hundred microseconds); such complete breaking may for instance occur in case of particularly severe faults, e.g., under extreme conditions wherein it may even have an indefinite temporal duration. In particular, the first electronic unit 110 can be configured so as to cyclically drive the opening and closure of the semiconductor electronic breaking device 11, for example by means of the known shutting principle.

Hence in these cases, the first circuit breaker 10 isolates all the grid downstream from it for a predetermined and suitable period of time in order to prevent damage that may be caused by the sudden fault severity; in the meantime however the unit 110 transmits the intervention command signal 300 to all of the circuit breakers at the lower level therefore waiting, as previously described, for one of the downstream circuit breakers among those that sensed the fault to trip by breaking the current and isolating a more limited area of the grid. Then, also in this case, the second electronic unit associated to the tripped circuit breaker transmits to first electronic unit 110 a consent signal suitable to request the restoration for the first circuit breaker 10 of the operating conditions existing prior to the fault; in this case also, in addition or in alternative, it is possible for the unit 110 to directly verify that the area affected by the fault was isolated by a lower circuit breaker and therefore that the first circuit breaker 10 may be restored to the operating conditions existing prior to the fault.

In any case, the first electronic unit 110 is configured so as to open the first circuit breaker and in practice permanently interrupt (i.e. indefinitely until for example an operator causes the restoration) the current flowing if, after a predetermined time from the fault appearance, or at the reaching of dangerous conditions, such as for example particularly high temperature or currents, any other circuit breaker at the lower hierarchy has tripped to isolate the area affected by such a fault.

In all the above described cases, the driving of the semiconductor device 11 is very rapid and may generate overvoltage, which are limited by the protection and dissipation circuit 15.

It has been observed in practice that the system and method 200 according to the disclosure allow to achieve the desired object offering a very high selectivity level, and in principle applicable to any desired lower hierarchy level. Such a result is obtained according to a logic that is contrary to known solutions, that is to say according to a top-bottom fault management configuration wherein the most important circuit breaker in the hierarchy, covering the whole grid below, e.g. the circuit breaker 10, simulates the operated intervention by limiting the current and transmits to the lower circuit breakers the intervention request, waiting for one of them to isolate an area of the grid as much limited as possible.

Also, thanks to the adoption of a semiconductor breaking device (at least for the hierarchically most important circuit breaker) some of the drawbacks typical of mechanical or electromechanical circuit breakers are limited, for example in direct current circuits, when a very short intervention times or very small fault energy are required, or when a particularly large number of electric operations is required.

Figure 7:
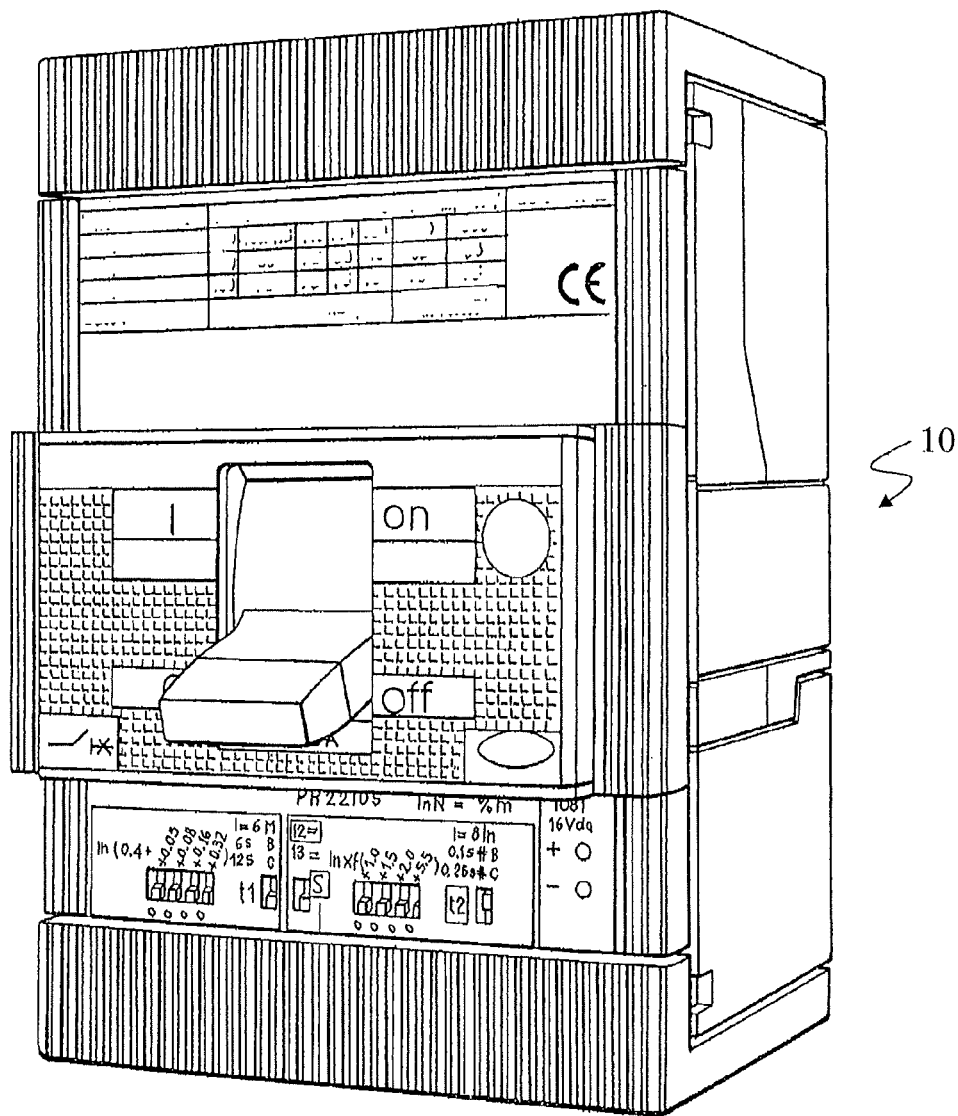
FIG. 7 is a perspective view illustrating an example of a moulded case circuit breaker.

From the implementation point of view, in case of a pure static circuit breaker, the semiconductor device 11 may be used directly in the grid or positioned inside a special container or box together with its electronic unit; in case of hybrid circuit breaker, the device 11 may be positioned inside an existing circuit breaker of the traditional type, for example inside a moulded case circuit breaker (MCCB) an exemplary embodiment of which is illustrated in FIG. 7, or in an air circuit breaker, or modular circuit breaker (MCB).

The system and method previously described are subject to numerous modifications and variations, all of which are in the scope of the inventive concept as defined in the appended claims; for example, in the preceding description for simplicity sake, all electronic units related to the circuit breakers hierarchically lower than the first circuit breaker 10 have been considered capable of exchanging messages with the circuit breakers of higher or lower levels, and managing the top-bottom selectivity logic described above. Clearly, it's possible that some circuit breakers at a certain level are not provided with an electronic unit capable to propagate to the next level the top-bottom logic for the selectivity interventions or that they may not be provided with any electronics; for example, this may occur in case of branches or areas of the grid where their possible disconnection due to any fault condition does not represent an issue. One or more of the additional lower level circuit breakers could be provided or could be realized by a semiconductor breaking device of the previously described type 11. At a certain lower level, a circuit breaker could be configured similarly to the circuit breaker 10 and its first electronic unit 110; in this case for example, the selective protection settings could be regulated so that this circuit breaker is the most hierarchically important for the downstream circuit breakers and be coordinated and independent or in any event hierarchically subject to those of first circuit breaker 10. Furthermore, all details can be replaced by other equivalent technical elements. For example, an electronic unit may be directly included inside the circuit breaker body, it is associated with, or externally.

In practice, the materials, as well as the dimensions, could be of any type according to the requirements and the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for the protection of a power grid against electric faults, comprising:

a plurality of circuit breakers each associated with a corresponding grid area, the plurality of circuit breakers including at least a first circuit breaker operatively associated with a first electronic unit and positioned at a first hierarchy level, and one or more additional circuit breakers each including a corresponding second electronic unit and positioned at one or more additional levels hierarchically lower than the first level and in cascade to each other, wherein the first circuit breaker includes at least one semiconductor electronic breaking device, and wherein the first electronic unit is configured to, upon appearance of an electric fault in a grid area:

drive the semiconductor electronic breaking device so as to limit the current flowing through the semiconductor electronic breaking device for a predetermined period of time; and send to at least one of the one or more additional circuit breakers an intervention command suitable to allow the intervention, among the circuit breakers that detected the fault, of the circuit breaker positioned closest and immediately upstream of the area where the fault occurred.

2. The system according to claim 1, wherein upon the appearance of an electric fault in a grid area, the first electronic unit is configured to drive the semiconductor electronic breaking device and break the current flowing through the semiconductor electronic breaking device for a predetermined period of time.

3. The system according to claim 1, wherein, whenever the intervention of a circuit breaker among the one or more additional circuit breakers has occurred, the second electronic unit associated with the intervened circuit breaker is configured to send to the first electronic unit a signal suitable for requesting the restoration for the first circuit breaker of the operating conditions prior to the fault.

4. The system according to claim 1, wherein, whenever after a predetermined period of time, no circuit breaker among the one or more additional circuit breakers has intervened, the first electronic unit is configured to break the current flowing through the first circuit breaker for an indefinite period of time.

5. The system according to claim 2, wherein the first electronic unit is configured to cyclically drive the opening and closure of the semiconductor electronic breaking device.

6. The system according to claim 1, wherein the one or more additional circuit breakers are positioned at least at a second level hierarchically lower than the first level, and on a third level hierarchically lower than the second level, and wherein the second electronic units of the circuit breakers that are positioned at the second level are configured to propagate the intervention command sent by the first electronic unit to the third level circuit breakers.

7. The system according to claim 1, wherein the first electronic unit is configured to directly verify the fault end and consequently restore for the first circuit breaker the operating conditions prior to the fault.

8. The system according to claim 1, wherein the first circuit breaker includes a single breaking device realized by a semiconductor electronic circuit breaker.

9. The system according to claim 1, wherein the first circuit breaker is a hybrid circuit breaker comprising:

a first semiconductor electronic breaking device; and a second electromechanical breaking device having at least one fixed contact and one contact movable between a closed position in which the second electromechanical breaking device is coupled with the fixed contact, and an open position in which the second electromechanical breaking device is separated from the fixed contact, the semiconductor electronic breaking device being connected in parallel to the fixed and mobile contacts.

10. The system according to claim 1, comprising:
a bidirectional control bus suitable to let communicate the first electronic unit with one or more of the second electronic units, each associated with one of the one or more additional circuit breakers.

11. A method for the protection of a power grid provided with a plurality of circuit breakers, each of the circuit breakers being associated with a corresponding grid area to be protected against electric faults, the method comprising:
positioning at a first hierarchy level at least a first circuit breaker operatively associated with a first electronic unit and including at least one semiconductor electronic breaking device, and positioning one or more additional circuit breakers each including a corresponding second electronic unit at one or more additional levels hierarchically lower than the first level and in cascade to each other;
upon the appearance of an electric fault in a grid area, driving, by means of the first electronic unit, the semiconductor electronic breaking device so as to at least limit the current flowing through the semiconductor electronic breaking device for a predetermined period of time; and
sending to at least one of the one or more additional circuit breakers an intervention command suitable to enable the opening, among the circuit breakers that detected the fault, of the circuit breaker positioned closest and immediately upstream of the area where the fault occurred.

12. The method according to claim 11, wherein the driving step comprises opening the semiconductor electronic circuit breaker so as to break the current flowing through it for a predetermined period of time.

13. The method according to claim 11, comprising, whenever the intervention of a circuit breaker among the one or more additional circuit breakers has occurred:
sending a signal, suitable for requesting the restoration of the operating conditions prior to the fault for the first circuit breaker, to the first electronic unit by means of the second electronic unit associated with the intervened circuit breaker.

14. The method according to claim 11, comprising, whenever after a predetermined period of time, no circuit breaker among the one or more additional circuit breakers has intervened:
breaking for an indefinite period of time the current flowing through the first circuit breaker by means of the first electronic unit.

15. The method according to claim 12, wherein the driving step comprises cyclically driving the opening and closure of the semiconductor electronic breaking device.

16. The method according to claim 11, wherein comprising:
directly verifying the fault end by means of the first electronic unit and consequently restoring the operating conditions prior to the fault for the first circuit breaker.

* * * * *